Dec. 13, 1955 R. H. ALLEN 2,726,914
HOME FREEZER
Filed June 23, 1951 3 Sheets-Sheet 1

INVENTOR.
Richard H. Allen
BY
Alden D. Redfield
ATTORNEY

Dec. 13, 1955 R. H. ALLEN 2,726,914
HOME FREEZER
Filed June 23, 1951 3 Sheets-Sheet 3
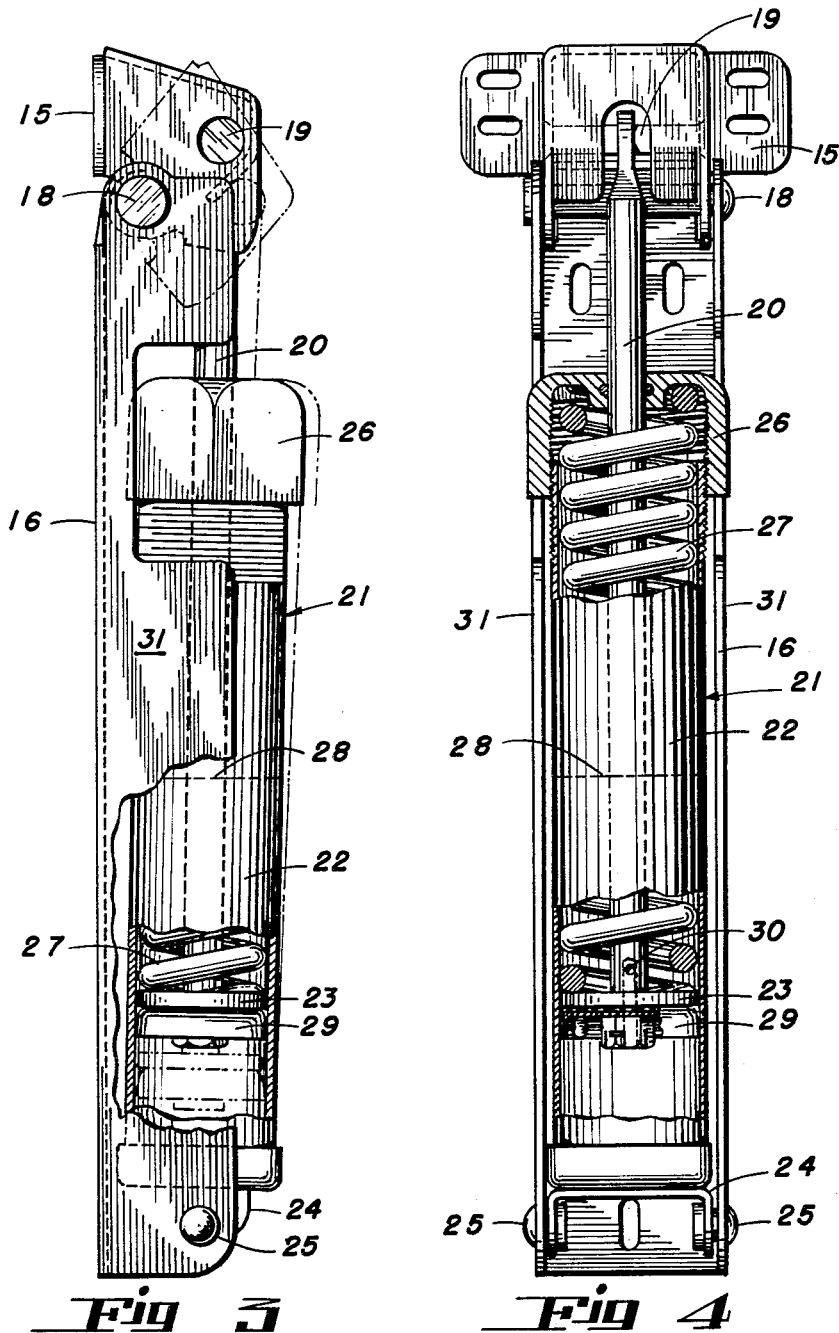
INVENTOR.
Richard H. Allen
BY Alden D. Redfield
ATTORNEY..

United States Patent Office 2,726,914
Patented Dec. 13, 1955

2,726,914

HOME FREEZER

Richard H. Allen, St. Louis, Mo., assignor to Avco Manufacturing Corporation, Cincinnati, Ohio, a corporation of Delaware Application June 23, 1951, Serial No. 233,200

4 Claims. (Cl. 312—223)

The present invention relates broadly to food storage cabinets and more specifically concerns home freezers used domestically for storing food products under refrigerated conditions.

Home freezers have become a familiar part of the American scene and are presently in wide spread use for storing a variety of food products in the home. A large number of relatively small food packages are usually stored within the freezer which are difficult to find particularly when the freezer is of the type having a food storage compartment which is accessible by means of a horizontally disposed lid. The most advanced design of home freezer now available on the market has substantially eliminated this problem by providing food retainers attached to the inner face of the lid. In freezers of this type, it is possible to store a large number of commonly used items in the food retainers with the result that these items can be easily found and readily obtained merely by raising the lid of the freezer and sliding the item desired out of its retainer.

Because of the substantial weight of the lids usually provided on home freezers, it is conventional to use counterbalancing hinges which not only hingedly secure the lid to the main cabinet portion of the freezer but also supply forces tending to raise the lid at all times, thus reducing to a bare minimum the energy that must be expended by the user in raising the lid. The use of counterbalancing hinges is particularly important in home freezers because they are most frequently used by women.

It has been found from actual experience with home freezers of the type having food retainers on the lids that simple counterbalancing hinges are not satisfactory. The weight of the lid and the food products attached thereto varies during its use. Thus, at times when the retainers are filled to capacity, the lid weight is a maximum while at other times, when no food products are stored in the retainers, the weight of the lid is a minimum. This variable weight cannot be counterbalanced by a simple spring, since if the spring has sufficient force to balance a lid of maximum weight satisfactorily, the same force is excessive when the lid has a minimum weight with the result that the lid tends to spring open violently as soon as it is unlatched. On the other hand, if the force of the counterbalancing spring is satisfactory to compensate for a lid of minimum weight, the counterbalancing force is insufficient to raise a lid of maximum weight having a capacity load of food in the associated food retainers.

It is an important object of the present invention to provide a combined hinge and dash pot unit in combination with a home freezer having food retainers on its lid so that the lid is properly counterbalanced under all conditions of use. It is a further object of the present invention to combine with the hinges of such a home freezer fluid metering dash pot assemblies in combination with counterbalancing springs so that given spring forces are suitable to raise at an acceptable rate a home freezer lid having food retainers.

More specifically, it is an object of the present invention to provide in combination with a freezer of the type having a lid with food retainers combined hinge and dash pot units in which the dash pots consist of piston and cylinder fluid metering means in conjunction with counterbalancing springs, the rate of leakage of the fluid past the piston within the cylinder being metered and controlled so that the lid of the freezer will have a controlled rate of opening regardless of its weight.

More broadly stated, it is an object of the present invention to provide means for controlling within desirable limits the rate of opening of a counterbalanced home freezer lid of the type including food retainers on its inner face.

Briefly, the present invention contemplates the provision of a home freezer having a horizontally disposed access lid which is hinged for opening and closing movements about a horizontal hinge line. A releasable latch of any conventional type may be provided on the freezer in addition to combined hinge and dash pot units for hingedly securing the lid to the main cabinet portion of the freezer. Each of these units includes a hydraulic piston and cylinder assembly inside of which a counterbalancing spring is provided. The spring forces act to open the lid at all times, such opening movement being resisted by leakage of oil within the hydraulic cylinders. The cylinder and piston assemblies are of such a design that substantially no resistance is offered when the lid of the freezer is closed. By virtue of the present invention, a desirable rate of opening is attained when the latch is released regardless of the weight that the lid may have because of the various quantities of food stored in the retainers.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
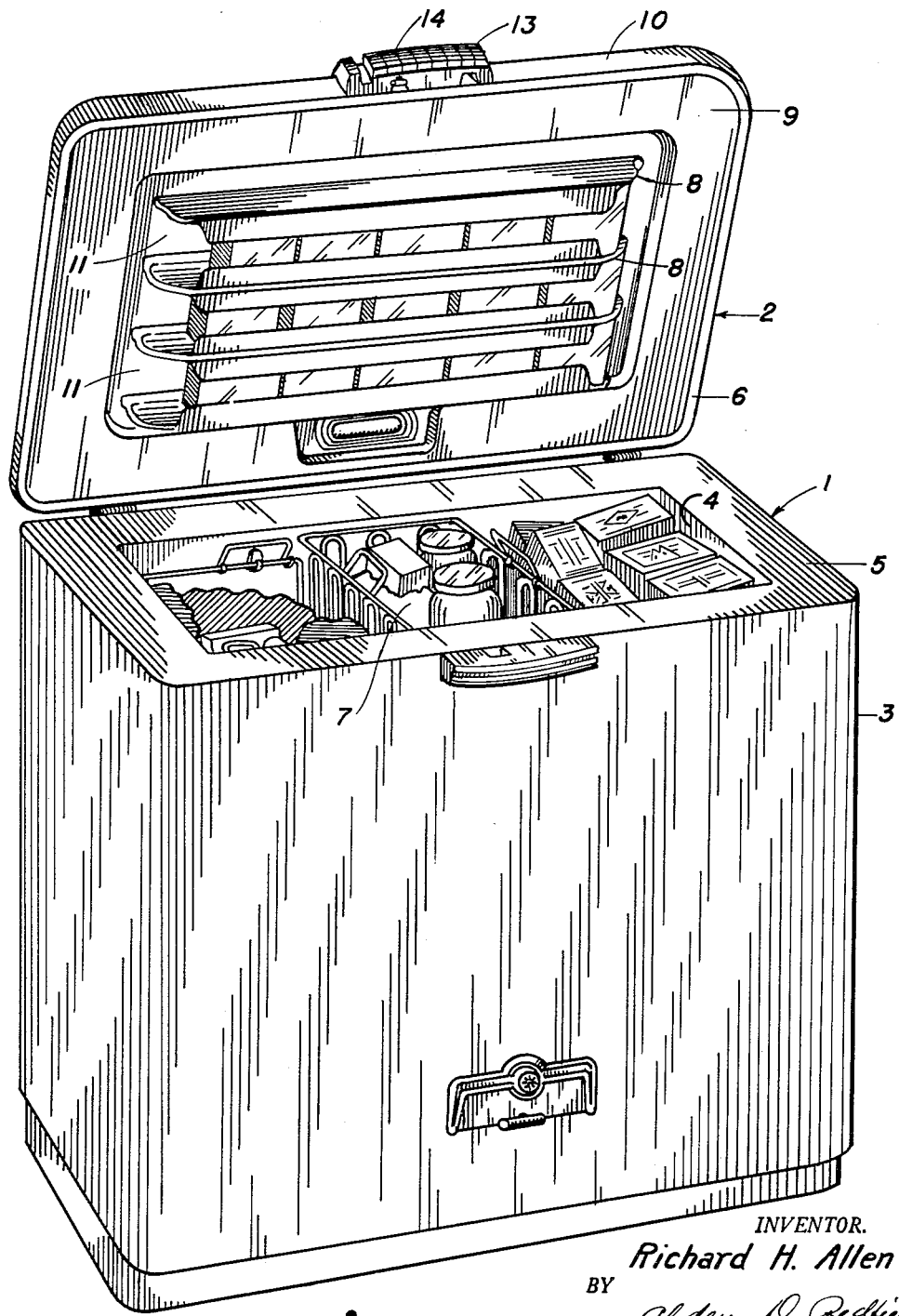
Figure 1 shows in perspective a domestic home freezer with its horizontally disposed access lid in an open position, a plurality of food retainers being shown attached to the inner face of the lid.

Figure 3 is a side elevational view to an enlarged scale showing in full lines the position of a hinge and dash pot unit assumed when the lid is in its closed position, the position assumed by the unit when the associated lid is in its open position being shown in phantom lines. A part of the unit is broken away and shown in section to illustrate the construction of the piston member provided within the cylinder of the unit; and Figure 4 is a rear elevational view of the combined hinge dash pot unit, a portion of the unit being broken away and shown in section to facilitate a description of its internal construction.

The home freezer with which the present invention is combined comprises a cabinet portion, generally designated 1, and a horizontally disposed access lid, generally designated 2. The cabinet includes an outer shell 3 and an inner liner 4, thermal insulation (not shown) being included between shell 3 and liner 4. A breaker strip 5 extends between the outer shell and the inner liner and cooperates with a resilient gasket 6 secured to lid 2 for sealing the interior of the home freezer when the lid is in its closed position.

Liner 4 defines a food storage compartment 7 in which a multiplicity of food articles may be stored under refrigerated conditions. Small articles of food may also be stored in a plurality of parallel spaced food retainers 8 which are rigidly secured to the inner face of liner 9 which is one component of the lid 2. The exterior of the lid is defined being shell 10. As will be obvious from Figure 1, packages of food may be introduced between the food retainers through spaces 11 provided at their ends and at any one time the number of food packages stored within the retainers may be varied at will. It has been found in practice that fifteen pounds of food is convenient for storage in the retainers of a home freezer.

The food retainers do not comprise any part of the present invention, having been fully described and claimed in pending application Serial No. 209,489, filed February 5, 1951, by Ralph E. Cappel. For the purposes of the present disclosure, it is sufficient to understand that the food retainers are attached to the lid to render accessible a multiplicity of small food packages which would otherwise have to be stored within the main food storage compartment of the freezer.

Figure 2:
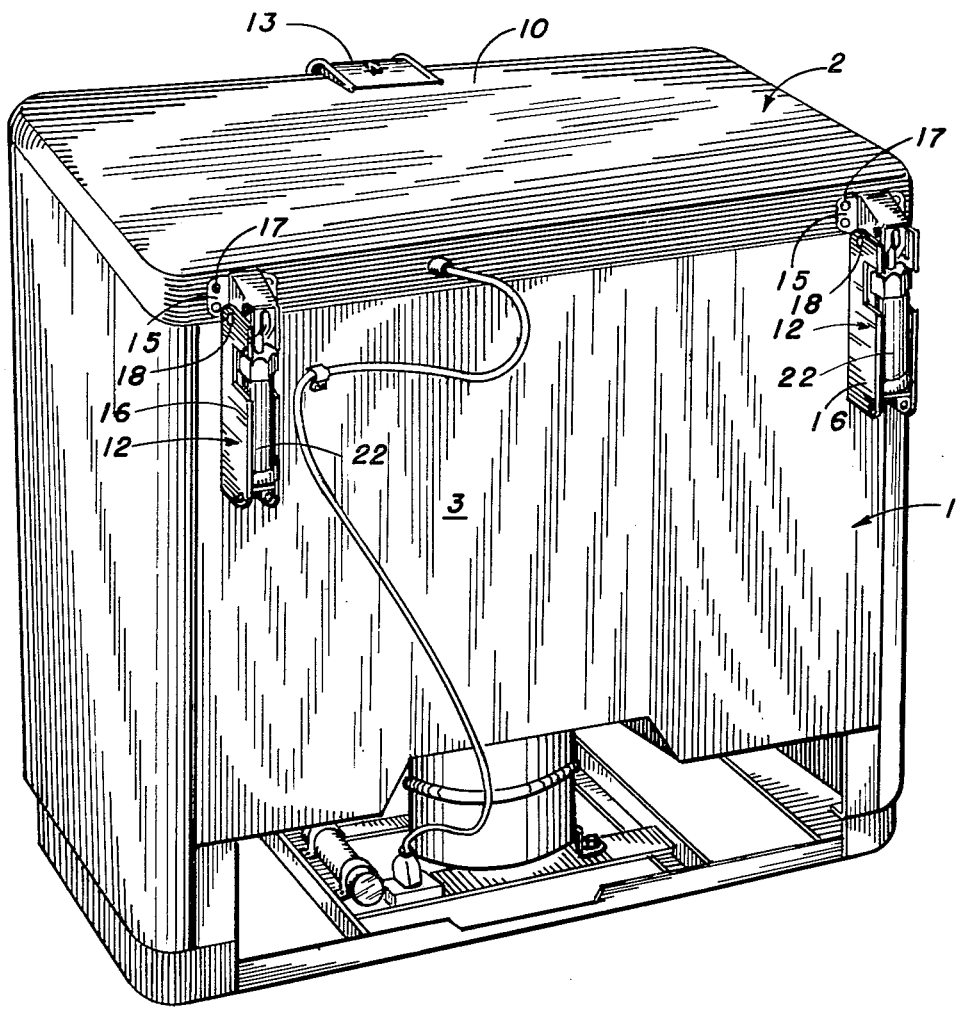
Figure 2 shows in perspective the back side of the home freezer, a pair of combined hinge and dash pot units being shown secured to the lid and cabinet portion of the freezer.

With reference to Figure 2, it should be noted that lid 2 is secured to cabinet portion 1 of the home freezer by means of a pair of combined hinge and dash pot units, generally designated 12. As will be described more fully hereinafter, these units include hinge components as well as dash pots inside of which are provided counterbalancing springs which act to raise the lid at all times. A releasable latch 13 is provided on the side of the home freezer remote from units 12. Although any conventional latch may be used, it has been found convenient to provide a push bar type latch which can be released merely by force applied laterally to bar 14 which releases the internal mechanism of the latch and permits the lid to rise solely under the influence of the counterbalancing hinges. It is to be noted that the lid is hingedly attached to the cabinet for swinging movement about a horizontally disposed hinge line located adjacent the top rear edge of the cabinet.

The specific details of a combined hinge and dash pot unit are shown in Figures 3 and 4. With reference to these figures, it will be noted that each unit includes upper and lower hinge members 15 and 16, respectively. Member 15 is secured to lid 2 by any conventional fasteners, such as screws 17 (see Figure 2). The lower hinge member 16 is attached by conventional fasteners (not shown) to the rear face of cabinet 1. Pivot pin 18 pivotally secures member 15 to member 16.

When lid 2 is in its closed position, the hinge members 15 and 16 assume the positions shown in full lines in Figure 3. As the lid is raised, member 15 swings clockwise to the position indicated by phantom lines in this same figure.

Hinge member 15 carries a transverse pin 19 which is swung in an arc about pivot pin 18 as the lid of the home freezer is raised. A piston rod 20, projecting from a dash pot assembly, generally designated 21, is pivotally engaged at its upper end with transverse pin 19, the piston rod being forced into the assembly 21 as the lid of the freezer is raised and hinge member 15 is rotated clockwise.

The dash pot assembly includes a cylinder 22, which slidably retains a piston member 23 secured to the lower end of piston rod 20, and a bracket 24 which is integrally secured to the lower end of cylinder 22 and is pivotally attached to hinge member 16 by means of rivets 25. These rivets permit a limited amount of swinging movement of the cylinder to accommodate corresponding movement of the piston rod 20 necessitated by the arcuate motion of transverse pin 19 as the lid of the freezer is raised.

A cap nut 26 is threadedly secured to the upper end of cylinder 22 and not only guides piston rod 20 but also confines within the cylinder a counterbalancing spring 27 which bears at its lower end on piston member 23.

It is to be noted that spring 27 is compressed when the home freezer lid is closed and at all times urges the lid towards its open position by virtue of the spring force acting on piston member 23 and consequently piston rod 20. Since transverse pin 19 is laterally displaced from pivot pin 18, a moment arm is provided through which the spring force acts, whereby a torque is created tending to raise the lid. This tendency is overcome by the engagement of latch 13. The counterbalancing springs act to raise the lid the instant that bar 14 is pushed to release the latch mechanism.

The lower portion of the cylinder 22 is filled with any suitable fluid such as oil to a level indicated at 28. As the freezer lid is raised, piston member 23, including a flexible piston seal 29, tends to trap and compress the oil in the lower end of the cylinder. The compressed oil flows out of the lower end of the cylinder by means of a passageway 30 formed in the lower end of piston rod 20. This passageway constitutes a metering restriction or orifice for permitting leakage from the lower end of the cylinder at a controlled rate. The rate of leakage determines the rate at which the lid of the home freezer can rise under the influence of the counterbalancing springs 27 as will be described more fully hereinafter. Passageway 30 can be made of a suitable size to restrict the rate of leakage so that the rate of rise of the freezer lid is acceptable under all conditions of use.

It is to be noted that seal 29 is of an inverted cup shape which tends to trap the fluid in the lower end of the cylinder whenever the piston member is moved downwardly. However, by virtue of the shape and flexibility of the seal the piston member may be raised easily and the oil above the piston may seep with little resistance past the seal into the lower end of the cylinder. When the piston member is raised, energy is stored in spring 27 which is subsequently released and acts to raise the lid when the latch 13 is released.

For a full understanding of the present invention, it should be appreciated that the rate of leakage of the fluid out of the lower end of the cylinder directly determines the rate of opening of the lid. It should also be appreciated that according to the laws of hydraulics, the rate of leakage of the oil is proportional to the square root of the oil pressure caused by spring 27 in opposition to the weight of the lid. As has been pointed out generally hereinbefore, the weight of the lid may vary widely depending upon the amount and type of food stored within retainers 8. The weight of the lid directly opposes the forces of springs 27 in units 12. This being the case, the rate of leakage of the oil out of the lower ends of the cylinders and, consequently, the rate of opening of the lid, varies as the square root of the pressure imposed on the oil within the cylinder by the differential between the forces of springs 27 and the weight of the lid. Thus, a relatively large change in weight of the lid is reflected in the rate of rise of the lid to a disproportionately lesser extent.

To illustrate, a four to one change of weight in the lid only causes about a two to one change in the rate of rise of the lid. It should be realized that the change of weight of the lid is usually much less than four to one with the result that the rate of rise changes much less than in the ratio of two to one. In other words, for practical purposes, the present invention makes it possible to approach a substantially constant rate of rise of the lid for a sizeable change in lid weight due to storage of various quantities of food within the retainers.

With reference to Figures 3 and 4 it should be noted that cap nut 26 can be threadedly adjusted on cylinder 22 to regulate the force of spring 27. Once the degree of compression of the spring is properly established, there is no need for further adjustment.

It is also to be noted that side walls 31 may be provided on hinge member 16 to house cylinder 22 and to preclude the possibility of persons getting their fingers pinched between the cylinder and hinge member during its movement while the lid is being closed.

It is preferable, although not necessary, to combine the dash pot assemblies with the hinges as disclosed hereinbefore. However, it is possible to separate the dash pot assemblies from the hinges and to attach them to the cabinet and lid at points removed from the hinges. In the event that such a separation is made and the counterbalancing springs cooperate with the hinges rather than with the dash pot assemblies, a twisting action is imposed on the lid due to resistance of the dash pots in opposition to the spring forces of the hinges as the lid is opened. Thus, with the dash pots and hinge assemblies remote from one another, the forces resulting may tend to twist the portion of the lid in between, which is obviously undesirable.

From the foregoing, it will be apparent that a novel combination of elements has been invented making it possible to incorporate food retainers on the lid of a home freezer and to control the rate of opening of the freezer lid under the influence of counterbalancing springs within desirable limits.

Having fully described a specific embodiment of my invention, I claim:

1. In combination, a food storage cabinet comprising an outer shell, and an open topped inner liner; a horizontally disposed access lid comprising an outer shell and an inner liner; a plurality of food retainers secured to said lid liner; a plurality of hinges secured to said cabinet shell and said lid shell providing a horizontally disposed hinge line about which said lid may execute opening and closing movements; a releasable latch interconnecting said cabinet and said lid remote from said hinges; and a plurality of dash pots pivotally connected to said hinges to resist opening movements of said lid while permitting unrestricted closing movements; each of said dash pots including a relatively movable piston within a cylinder, said cylinder being partially filled with a fluid medium, a fluid metering passageway to by-pass said medium past said piston within said cylinder, and a spring acting on said cylinder and said piston yieldably urging said lid to open at all times.

2. In combination in a home freezer including a cabinet formed to define a food storage compartment and a horizontally disposed lid providing access to the compartment, a plurality of food retainers on the inner face of the lid, a releasable latch for securing the lid to the cabinet, and a plurality of combined hinge and dash pot units secured to the cabinet and the lid permitting opening and closing movements of the lid about a horizontally disposed hinge line, each of said combined hinge and dash pot units comprising a pair of pivotally connected hinge members, a spring constantly urging the lid to open and a fluid metering dash pot connected between said hinge members and restraining opening movements of the lid while offering no substantial restraint to closing movements.

3. In combination in a home freezer including a cabinet formed to define a food storage compartment and a horizontally disposed lid providing access to the compartment, a plurality of food retainers secured to the inner face of the lid for supporting thereon various weights of food to meet the requirements of use, hinges secured to the cabinet and the lid permitting movements of the lid about a horizontally disposed hinge line, a releasable latch securing the lid to the cabinet remote from said hinges, yieldable means constantly urging the lid to open, and a dash pot secured to the cabinet and to the lid to restrain opening movements of the lid while offering no substantial resistance to closing movements, the force of said yieldable means for urging the lid to open being opposed by the weight of the lid and the food supported thereon as well as the dash pot whereby the rate of opening of the lid is maintained within predetermined desirable limits.

4. In combination in a home freezer including a cabinet formed to define a frozen food storage compartment and a horizontally disposed lid providing access to the compartment, means connected to the lid for supporting a variable weight of frozen food, hinges secured to the cabinet and the lid permitting movements of the lid about a horizontally disposed hinge line, a releasable latch securing the lid to the cabinet remote from said hinges, yieldable means constantly urging the lid to open, and a fluid metering dash pot secured to the cabinet and to the lid for restraining opening movements of the lid while offering no substantial resistance to closing movements.

References Cited in the file of this patent

UNITED STATES PATENTS

| | | |
|---|---|---|
| 587,418 | Zinsel | Aug. 3, 1897 |
| 1,644,045 | Weeks | Oct. 4, 1927 |
| 1,818,250 | Harrah et al. | Aug. 11, 1931 |
| 1,941,399 | Ischebeck | Dec. 26, 1933 |
| 2,101,702 | Crosely | Dec. 7, 1937 |
| 2,161,101 | Simms | June 6, 1939 |
| 2,390,030 | Paulson | Nov. 27, 1945 |
| 2,500,057 | Borgerd et al. | Mar. 7, 1950 |
| 2,641,019 | Burke | June 9, 1953 |